US012776483B2

(12) United States Patent
Beric et al.

(10) Patent No.: US 12,776,483 B2
(45) Date of Patent: Oct. 27, 2026

(54) MICRO CHANNEL CARTRIDGE FOR MASS SPECTROMETER

(71) Applicant: DH Technologies Development Pte. Ltd., Singapore (SG)

(72) Inventors: Nikola Beric, Etobicoke (CA); Graham Arthur Leith, Toronto (CA)

(73) Assignee: DH Technologies Development Pte. Ltd., Singapore (SG)

( * ) Notice: Subject to any disclaimer, the term of this patent is extended or adjusted under 35 U.S.C. 154(b) by 375 days.

(21) Appl. No.: 18/556,176

(22) PCT Filed: Apr. 29, 2022

(86) PCT No.: PCT/IB2022/053993
§ 371 (c)(1),
(2) Date: Oct. 19, 2023

(87) PCT Pub. No.: WO2022/229917
PCT Pub. Date: Nov. 3, 2022

(65) Prior Publication Data

US 2024/0194467 A1 Jun. 13, 2024

Related U.S. Application Data

(60) Provisional application No. 63/181,522, filed on Apr. 29, 2021.

(51) Int. Cl.
*H01J 49/04* (2006.01)

(52) U.S. Cl.
CPC ................................ *H01J 49/0409* (2013.01)

(58) Field of Classification Search
CPC .................................................. H01J 49/0409
See application file for complete search history.

(56) References Cited

U.S. PATENT DOCUMENTS 4,731,538 A 3/1988 Gray
5,770,858 A 6/1998 Fuchs et al.
(Continued)

FOREIGN PATENT DOCUMENTS

CN 108630516 10/2018
CN 109346446 A * 2/2019 .......... H01L 23/473
(Continued)

OTHER PUBLICATIONS

PCT International Preliminary Report on Patentability in Application PCT/IB2022/053993, mailed Nov. 9, 2023, 17 pages.
(Continued)

*Primary Examiner* — Georgia Y Epps
*Assistant Examiner* — Hanway Chang
(74) *Attorney, Agent, or Firm* — Merchant & Gould P.C.

(57) ABSTRACT

A cartridge assembly for a mass spectrometer includes two detector plates. Each of the two detector plates includes (a) an active area defining a plurality of channels from a first side of each of the two detector plates to a second side of each of the two detector plates, and (b) a plurality of clamping areas. A spacer is disposed between the two detector plates and includes a plurality of clamping tabs aligned with each of the plurality of clamping areas. A washer is disposed proximate a second detector plate and includes a plurality of clamping blocks aligned with each of the plural-ity of clamping tabs. A cartridge housing includes a first portion disposed adjacent a first detector plate, and a second portion disposed adjacent the second detector plate, and fasteners span the first and second portions. A biasing element is disposed between the washer and the first portion.

20 Claims, 9 Drawing Sheets

(56) References Cited

U.S. PATENT DOCUMENTS

| | | | | |
|---|---|---|---|---|
| 6,265,812 | B1 | 7/2001 | Watanabe et al. | |
| 7,089,956 | B1 * | 8/2006 | Davidson | F17C 13/04 137/382 |
| 2006/0011826 | A1 | 1/2006 | Scheidemann et al. | |
| 2010/0225221 | A1 | 9/2010 | Suzuki et al. | |
| 2010/0243887 | A1 | 9/2010 | Suyama et al. | |
| 2020/0312645 | A1 | 10/2020 | Kobayashi et al. | |

FOREIGN PATENT DOCUMENTS

| | | | |
|---|---|---|---|
| CN | 110824274 | | 2/2020 |
| CN | 111463101 | | 7/2020 |
| CN | 111799148 | | 10/2020 |
| EP | 1632973 | | 3/2006 |
| EP | 2099057 | | 9/2009 |
| JP | S63-040893 | A | 5/1993 |
| JP | 2007-527601 | A | 9/2007 |
| JP | 2010-205699 | A | 9/2010 |
| JP | 2010-238502 | A | 10/2010 |
| JP | 2020-170594 | A | 10/2020 |

OTHER PUBLICATIONS

PCT International Search Report and Written Opinion in Application PCT/IB2022/053993, mailed Aug. 22, 2022, 21 pages.
Japanese Search Report in corresponding Application 2023565907, mailed Feb. 18, 2026, 22 pages.
Japanese Refusal in corresponding Application 2023565907, mailed Feb. 24, 2026, 4 pages.

* cited by examiner

MICRO CHANNEL CARTRIDGE FOR MASS SPECTROMETER

CROSS-REFERENCE TO RELATED APPLICATION

This application is a National Stage Application of PCT/IB2022/053993, filed on Apr. 29, 2022, which claims the benefit of U.S. Provisional Application No. 63/181,522, filed on Apr. 29, 2021, the entire disclosures of which are incorporated herein by reference in their entireties. To the extent appropriate, a claim of priority is made to each of the above disclosed applications.

BACKGROUND

A micro-channel plate (MCP) is a planar component used for detection of single particles (electrons, ions, and neutrons), e.g., in a mass spectrometry (MS) device. The MCPs are stacked (e.g., in pairs) and ions are passed therethrough, where they are multiplied before being delivered to an anode for detection. Stacked MCPs with solid mounting pads without solid rims must be carefully assembled in an MCP cartridge.

SUMMARY

In one aspect, the technology relates to a cartridge assembly for a mass spectrometer, the cartridge assembly including: two detector plates, each of the two detector plates including (a) an active area defining a plurality of channels from a first side of each of the two detector plates to a second side of each of the two detector plates, and (b) a plurality of clamping areas; a spacer disposed between the two detector plates, the spacer including a plurality of clamping tabs, wherein each of the plurality of clamping tabs are aligned with each of the plurality of clamping areas; a washer disposed proximate a second detector plate of the two detector plates, wherein the washer includes a plurality of clamping blocks, wherein each of the plurality of clamping blocks are aligned with each of the plurality of clamping tabs; a cartridge housing including: a first housing portion disposed adjacent a first detector plate of the two detector plates; and a second housing portion disposed adjacent the second detector plate; a plurality of fasteners spanning the first housing portion and the second housing portion; and a biasing element disposed between the washer and the first housing portion. In an example, the plurality of clamping areas are disposed proximate a perimeter of the each of the two detector plates. In another example, the plurality of clamping areas includes channelless portions of each of the two detector plates. In yet another example, each of the plurality of clamping tabs extend outward from a perimeter of the spacer. In still another example, the washer includes an inner ring and an outer ring, and wherein the clamping blocks extend from the inner ring.

In another example of the above aspect, the inner ring is raised relative to the second detector plate. In an example, the biasing element includes an axial canted coil spring disposed proximate an outer portion of the washer.

In another aspect, the technology relates to a cartridge assembly for a mass spectrometer, the cartridge assembly including: an input detector plate, wherein the input detector plate defines a plurality of input plate channels extending from an input side of the input detector plate to an output side of the input detector plate; an output detector plate, wherein the output detector plate defines a plurality of output plate channels extending from an input side of the output detector plate to an output side of the output detector plate, and wherein the input detector plate and the output detector plate are aligned along a common axis; a spacer in contact with the output side of the input detector plate and the input side of the output detector plate; a washer disposed in contact with the output side of the output detector plate; an input housing portion disposed in contact with the input side of the input detector plate; and a biasing element in contact with the washer for biasing each of the washer, the output detector plate, the spacer, and the input detector plate towards the input housing portion. In an example, each of the plurality of input plate channels and each of the plurality of output plate channels includes: a channel axis disposed at an angle to the common axis; an input channel mouth defined by the input side of each of the input plate and the output plate, respectively; and an output channel mouth defined by the output side of each of the input plate and the output plate, respectively. In another example, the plurality of input plate channels includes a housing subset of input plate channels, wherein the input channel mouth of the housing subset of input plate channels is obstructed by the input housing portion, and wherein the output channel mouth of the housing subset of input plate channels is unobstructed. In yet another example, the plurality of input plate channels includes a spacer subset of input plate channels, wherein the input channel mouth of the spacer subset of input plate channels is unobstructed, and wherein the output channel mouth of the spacer subset of input plate channels is obstructed by the spacer. In still another example, the plurality of output plate channels includes a spacer subset of output plate channels, wherein the input channel mouth of the spacer subset of output plate channels is obstructed by the spacer, and wherein the output channel mouth of the spacer subset of output plate channels is unobstructed.

In another example of the above aspect, the plurality of output plate channels includes a washer subset of output plate channels, wherein the input channel mouth of the washer subset of output plate channels is unobstructed, and wherein the output channel mouth of the washer subset of output plate channels is obstructed by the washer. In an example, the output detector plate includes a clamping area characterized by an absence of the plurality of output plate channels. In another example, the washer contacts the clamping area on an output side of the output detector plate and the spacer contacts the clamping area on an input side of the output detector plate. In yet another example, the biasing element includes an axial canted coil spring having an inner diameter greater than an inner diameter of the washer. In still another example, the cartridge assembly further includes an output housing portion, wherein the axial canted coil spring biases the washer away from the output housing portion.

In another aspect, the technology relates to a method of assembling a cartridge, the method including: positioning an input detector plate against an input housing portion, wherein the input detector plate includes a plurality of input plate clamping areas, and wherein the input housing portion includes a plurality of plate support features; positioning a spacer against the input detector plate, wherein the spacer includes a plurality of clamping tabs; positioning an output detector plate against the spacer, wherein the output detector plate includes a plurality of output plate clamping areas; positioning a washer against the output detector plate, wherein the washer includes a plurality of clamping blocks; positioning a biasing element against the washer; and positioning an output housing portion against the biasing element, wherein the plurality of plate support features, the plurality of input plate clamping areas, the plurality of clamping tabs, the plurality of output plate clamping areas, and the plurality of clamping blocks are aligned. In an example, the method further includes fastening the output housing portion to the input housing portion, wherein fastening the output housing portion to the input housing portion applies a biasing force from the biasing element to each of the washer, the output detector plate, the spacer, the input detector plate, and the input housing portion. In another example, the method further includes applying a biasing force with the biasing element proximate a perimeter of each of the input housing portion, the input detector plate, the spacer, the output detector plate, and the washer.

DETAILED DESCRIPTION

Careful assembly of an MCP cartridge is critical for proper performance and to prevent damage to the MCPs. For example, the MCPs should be clamped in such a way to achieve maximum flatness of the plates. The mount and stack configuration must not trap gas in the MCP channels, which can cause a damaging discharge in the MCP channels to occur. The creepage paths around the edge of each MCP from the top metallization to the bottom metallization should not be shorted out by contact with any conductor. The clamping force must be sufficient to prevent movement of the MCP in response to shock and vibration. Finally, electrical contact must be made to the upper and lower MCPs to energize them to perform their electron multiplication function.

The cartridges described herein include a number of features to limit or eliminate damage to the MCPs or other components of an MCP cartridge or detector system, or which otherwise improve performance. In examples, the cartridges may include one or more of the following features. An input housing portion may include plate support features to contact the solid mounting pads or clamping areas on an input MCP. An input housing portion may also include an opening having a raised circular lip in contact with the circumference of the input MCP. A similar structure may be present on the output housing portion as well. A spacer may include clamping tabs aligned to the clamping area on the input and output MCPs. A portion of the housing may act as an insulator around the MCPs to confine the MCPs, align the spacer, and insulate the input housing from the output housing, and the edges of the MCPs from both housings. A biasing element in the form of a canted coil spring may be utilized to provide even and well-controlled force pressing a washer against the output MCP. The output housing portion compresses and holds the spring, washer, MCPs, and spacer in place. The components are configured such that no micro-channels are obstructed at both ends by contacting components. Alignment markings may be included to facilitate correct angular alignment of the MCPs, which may be important to achieving correct ventilation of the channels. Further, all parts are made with precision tolerance to ensure flatness.

As noted above, the configuration of the cartridges described herein ensures that no micro-channels are blocked on both ends. This allows faster pump down of the detector instrument to a safe operating condition and minimizes the risk of a discharge in the MCPs. Further, it provides for maximum flatness for the input MCP, thus reducing warp-induced jitter in the time-of-flight (ToF) measurement. For the user of the detector, this minimizes pump down time to the ready state, avoids the cost and inconvenience of premature MCP failure, and maximizes the resolution of the instrument.

Figure 1A:
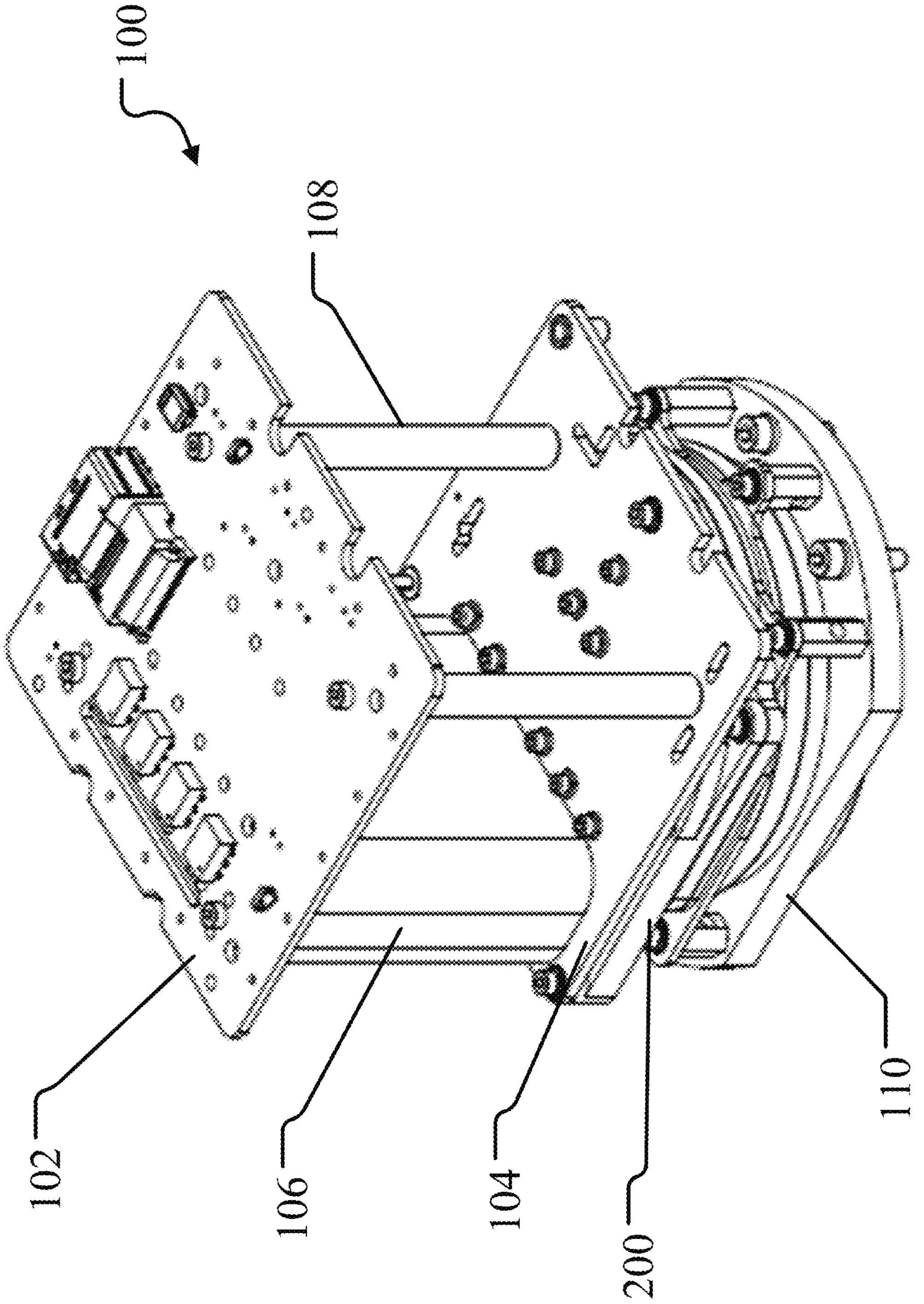
FIGS. 1A and 1B depict perspective and exploded perspective views of a detector assembly.
Figure 1B:
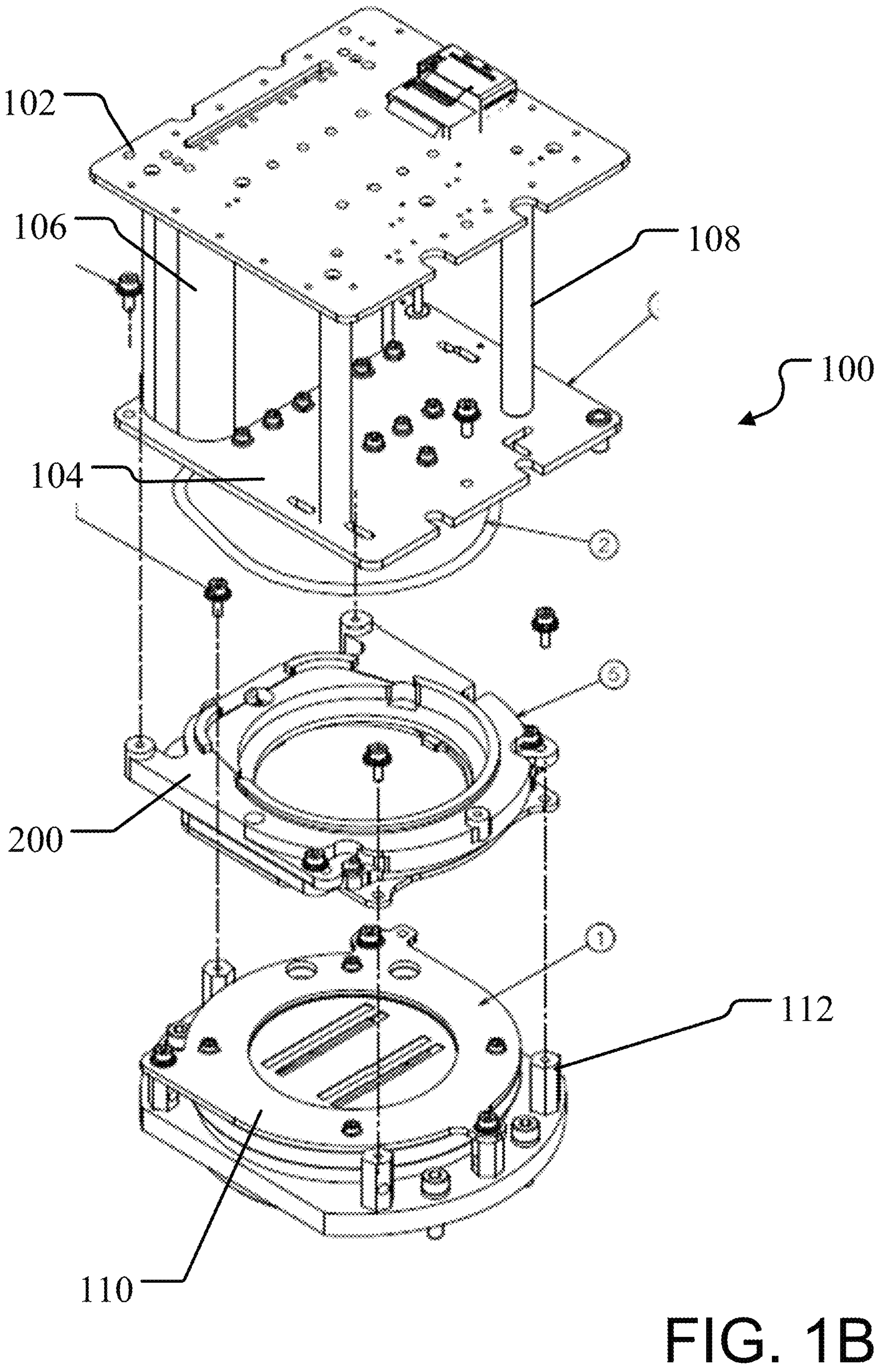

FIGS. 1A and 1B depict perspective and exploded perspective views of a detector assembly 100 for a mass spectrometry (MS) system, and are described concurrently. The detector 100 includes a plurality of printed circuit boards (PCBs) 102, 104. The upper PCB 102 may support or include, among other components, one or more preamplifiers, while the lower PCB 104 may support or include, among other components, anodes, transformers, a fence, etc., as known in the art. A potted transformer enclosure 106 spans the two PCBs 102, 104. One or more standoffs 110 provide rigidity to the portions of the PCBs 102, 104 opposite the enclosure 106. A base 110 including one or more fine wire grids, as known in the art, and forms the bottom portion of the detector assembly 100. Sandwiched between the base 110 and the lower PCB 104 is an MCP cartridge 200, which is described in further detail below. The cartridge 200 is secured to a plurality of standoffs 112 that project from the base 110. Ions from the mass analyzer portion of the mass spectrometer enter the detector assembly 100 through grids in the base 110, which serve to shield the mass analyzer from the electric fields in the detector. The ions strike an input MCP in the cartridge 200 (described below), creating secondary electrons which are further multiplied in the input MCP and an output MCP. The output pulse of electrons from the MCPs are captured on one or more anodes as a current pulse. The current pulse is transmitted through one or more transformers in the enclosure 106, which isolate the output signal path from the high voltages present on the anodes. The current pulse is further amplified and shaped by an electronic preamplifier circuit to create the output pulses from the detector.

Figure 2:
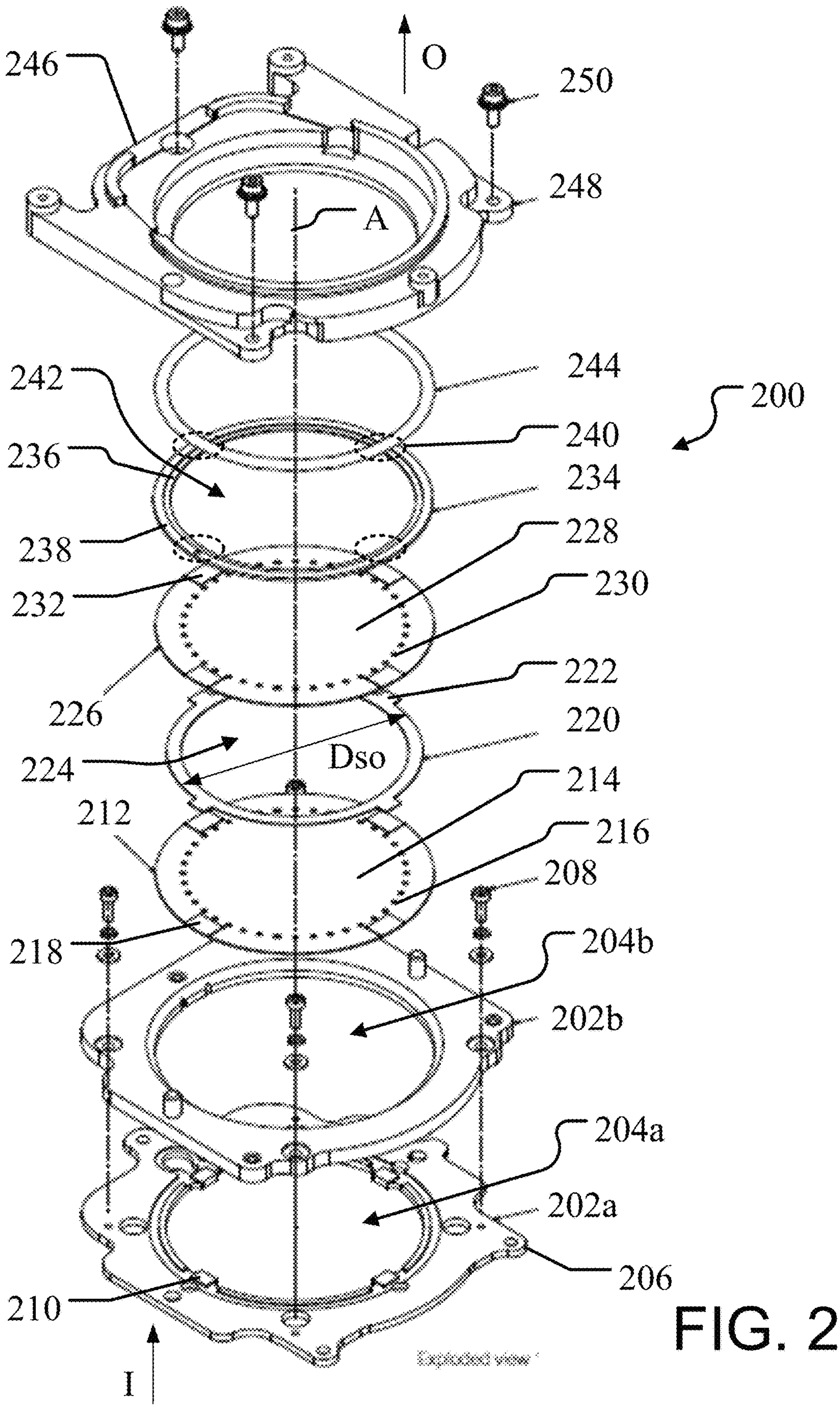
FIG. 2 depicts an exploded perspective view of a micro-channel plate (MCP) cartridge used in the detector assembly of FIGS. 1A and 1B.
Figure 3:
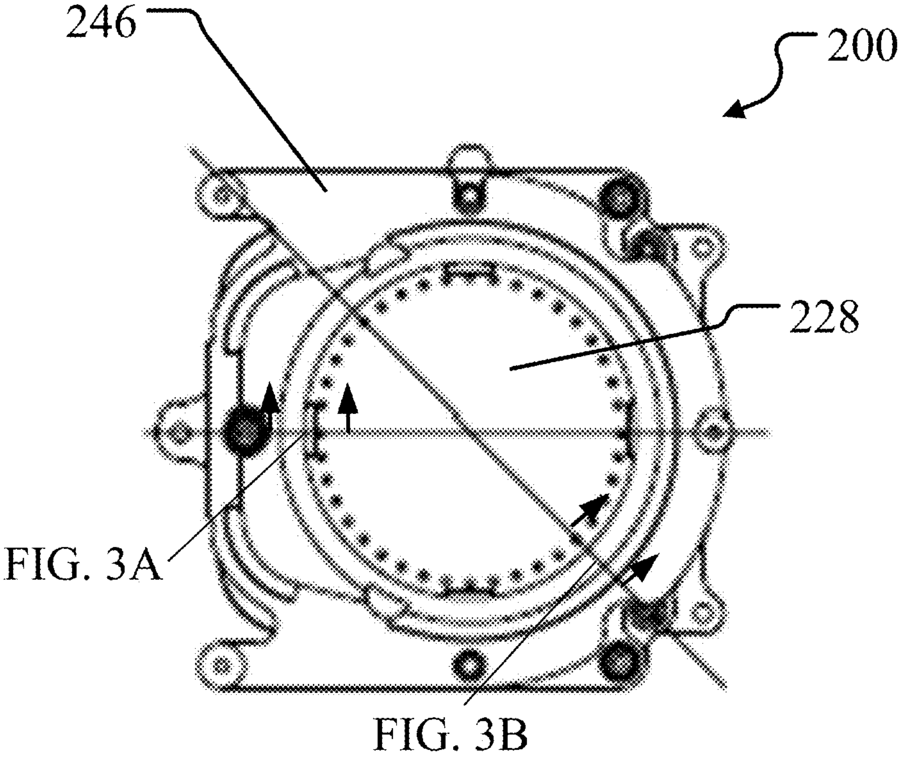
FIG. 3 depicts a top view of the MCP cartridge of FIG. 2, depicting the locations of the sections of FIGS. 3A and 3B.

FIG. 2 depicts an exploded perspective view of the MCP cartridge 200 used in the detector assembly of FIGS. 1A and 1B. It is understood that ions enter the detector assembly of FIGS. 1A and 1B (and thus, the cartridge 200 of FIG. 2) from below; the electrons resulting from passage through the cartridge exit on an output side thereof. This flow of ions is depicted in FIGS. 2-3B by the input I arrow, and output O arrow. Thus, in FIGS. 2-3B, each component described has both an input side (generally, the lower side of said component) and an output side (generally, the upper side of said component). Additionally, where multiple components of the same or similar type (or multiple portions of the same component) are utilized, those too may be described as being an "input" component or an "output" component, depending on their relative position within the MCP cartridge 200, as described below. Further, the various components are aligned along a common axis A. With these relative positions in mind, FIG. 2 is now described in detail.

The cartridge 200 includes a plurality of components that form a housing 202 thereof. An input housing portion of the housing includes components 202*a* and 202*b*. Both of input housing portions 202*a* and 202*b* define an opening 204*a*, 204*b* therein. The lower input housing portion 202*a* includes a plurality of flanges 206 that may be secured to the standoffs 112 depicted in FIGS. 1A and 1B, e.g., with mechanical fasteners. The upper input housing portion 202*b* may be secured to the lower input housing portion 202*a* with one or more fasteners such as screw or bolts 208. In other examples, other types of mechanical fasteners (such as press-fit or interference-fit fasteners), adhesives, or combinations thereof, may be used to secure the two input housing portions 202*a* (which acts as a conductor), 202*b* (which acts as an insulator). The two input housing portions 202*a* acts as a conductor of voltage to an input MCP 212 and includes a plurality of plate support features 210, four of which are depicted in FIG. 2. The plate support features 210 are disposed proximate the opening 204*a* and may include a projection, flange, or other enlarged portion that is configured and positioned to contact discrete and predetermined portions of the input MCP 212. In examples, input housing portion 202*b* acts as an insulator and defines an opening 204*b* that may include a perimeter configured to receive and align other components of the cartridge 200.

The input MCP 212 is a micro-channel plate, a planar component used for detection of single particles (e.g., ions, electrons, neutrons, etc.) and low intensity impinging radiation. The input MCP 212 includes a body 214 made from highly resistive material and may have a thickness of about 2 mm. The body 214 includes a regular array of tiny tubes or slots (e.g., micro-channels) in a so-called "active area" of the body 214. The active area is not specifically depicted but may be considered any portion of the body 214 where one or more micro-channels are present. Each micro-channel is defined on an input side of the input MCP 212 by an input channel mouth and on an output side of the input MCP 212 by an output channel mouth. The micro-channels are densely distributed over a significant portion of the surface of the body 214, and may be approximately 5 micrometers in diameter. Micro-channels may be spaced apart by approximately 6 micrometers and may be distributed substantially parallel to each other. In examples, the micro-channels may enter the MCP 212 at a small angle to the surface (e.g., about 12° from normal), or orthogonal thereto (e.g., if the input beam is at an angle to the MCP 212). Although the micro-channels cannot be accurately depicted in FIG. 2 due to their small size, one circular distribution of micro-channels 216 are depicted enlarged for illustrative purposes.

The input MCP 212 also includes a plurality of clamping areas 218 positioned proximate a perimeter or periphery of the input MCP 212. Four clamping areas 218 are depicted but any number may be utilized. The clamping areas 218 are characterized by an absence of any micro-channels 216 therein, thus rendering the clamping areas 218 channelless. When the cartridge 200 is assembled, each clamping area 218 is aligned with one of the plate support features 210 on the input housing portion 202*a*, 202*b*. As described in more detail herein, this alignment help ensure the clamping force of the cartridge 200 is distributed at the appropriate areas of the input MCP 212.

A spacer 220 is positioned adjacent the input MCP 212. The spacer 220 includes an outer diameter Dso less than an outer diameter of the input MCP 212. Extending from an outer perimeter or periphery of the spacer 220 are a plurality of clamping tabs 222. When the cartridge 200 is assembled, each clamping tab 222 is aligned with one of the clamping areas 218 on the input MCP 212. Further, the spacer 220 defines a central opening 224 which may at least partially define a significant portion of the active area described above (with regard to the input MCP 212). More specifically, the opening 224 is sized such that the vast majority of micro-channels in the input MCP 212 are unobstructed by the spacer 220 itself. A micro-channel must be entirely unobstructed on both the input side and output side to detect ions. It may be advantageous to size the spacer 220 and arrange the micro-channels such that as large a number of the micro-channels as possible are unobstructed on both sides. The clamping tabs 222 are configured and positioned to contact discrete and predetermined portions of an output MCP 226.

The output detector plate 226 is a micro-channel plate, generally similar or identical to the input MCP 212. The output MCP 226 also includes a plurality of clamping areas 232 positioned proximate a perimeter or periphery of the input MCP 226. Four clamping areas 232 are depicted but any number may be utilized. The clamping areas 232 are characterized by an absence of any micro-channels 230 therein, thus rendering the clamping areas 232 "channelless." When the cartridge 200 is assembled, each clamping area 232 is aligned with one of the clamping tabs 222 on the spacer 220. As described in more detail herein, this alignment help ensure the clamping force of the cartridge 200 is distributed at the appropriate areas of the output MCP 226.

A washer 234 is positioned adjacent the output MCP 226. The washer 234 includes an inner ring 236 and an outer ring 238, which are described further with regard to FIGS. 3A, 3B, and 4B. The washer 234 also includes a plurality of clamping blocks 240 (not shown, but located at dashed areas 240) on an input side of the washer 234. When the cartridge 200 is assembled, each clamping block 240 is aligned with one of the clamping areas 232 on the output MCP 226. Further, the washer 234 defines a central opening 242 which may at least partially encompass a significant portion of the active area of the output MCP 226. More specifically, the opening 242 is sized such that the vast majority of micro-channels in the output MCP 226 are unobstructed by the washer 234 itself. A micro-channel must be entirely unobstructed on both the input side and output side to detect ions. It may be advantageous to size the washer 234 and arrange the micro-channels such that as large a number of the micro-channels as possible are unobstructed on both sides. The washer 234 positioned to contact along almost its entire output surface a biasing element 244.

The biasing element 244 may be an axial canted coil spring in contact with the washer 234 that distributes biasing force evenly across the washer 234. Thus, the force distribution against the remaining components between the washer 234 and the input housing portion 202*a*, 202*b* also remains even and consistent. The force of the spring biasing element 244 against the washer 234 is at least partially caused by contact between the spring 244 and the output housing portion 246. The outer housing portion 246 includes a number of flanges 248 configured to receive a mechanical fastener 250 such as a bolt or screw. The bolt or screw 250 extends from the output housing portion 248 and is secured to the input housing portion 202*a*, 202*b*, to draw the two housing portions 248, 202*a*, 202*b* together. This, in turn, evenly applies force of the spring 244 against the internal components of the cartridge 200. Notably, the force is applied primarily along the contact surfaces of the various components, that is, the clamping blocks 240, the clamping areas 232, the clamping tabs 222, the clamping areas 218, and the plate support features 210.

Figure 3A:
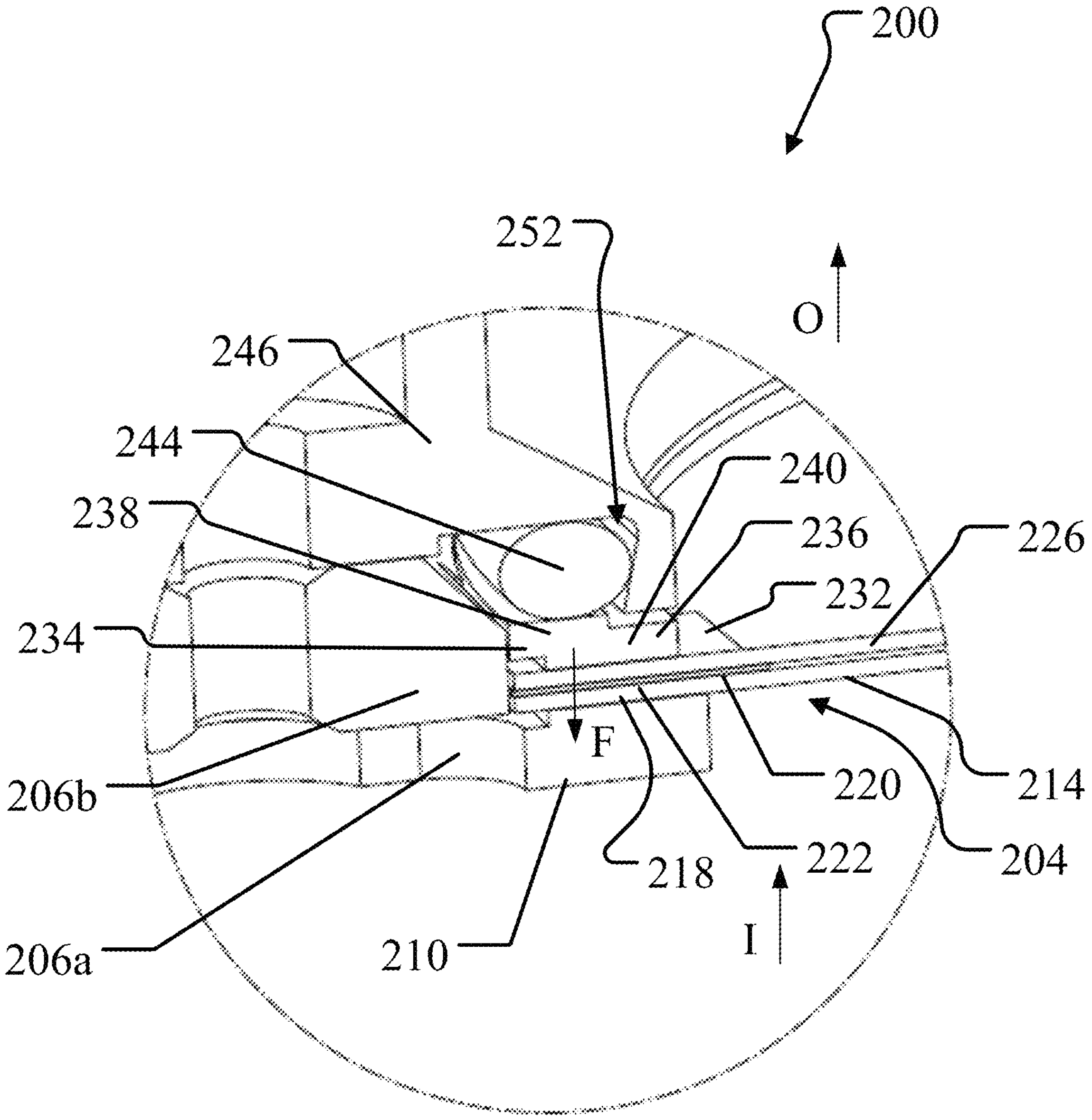
FIG. 3A depicts a clamping area section view of the MCP cartridge of FIG. 3.
Figure 3B:
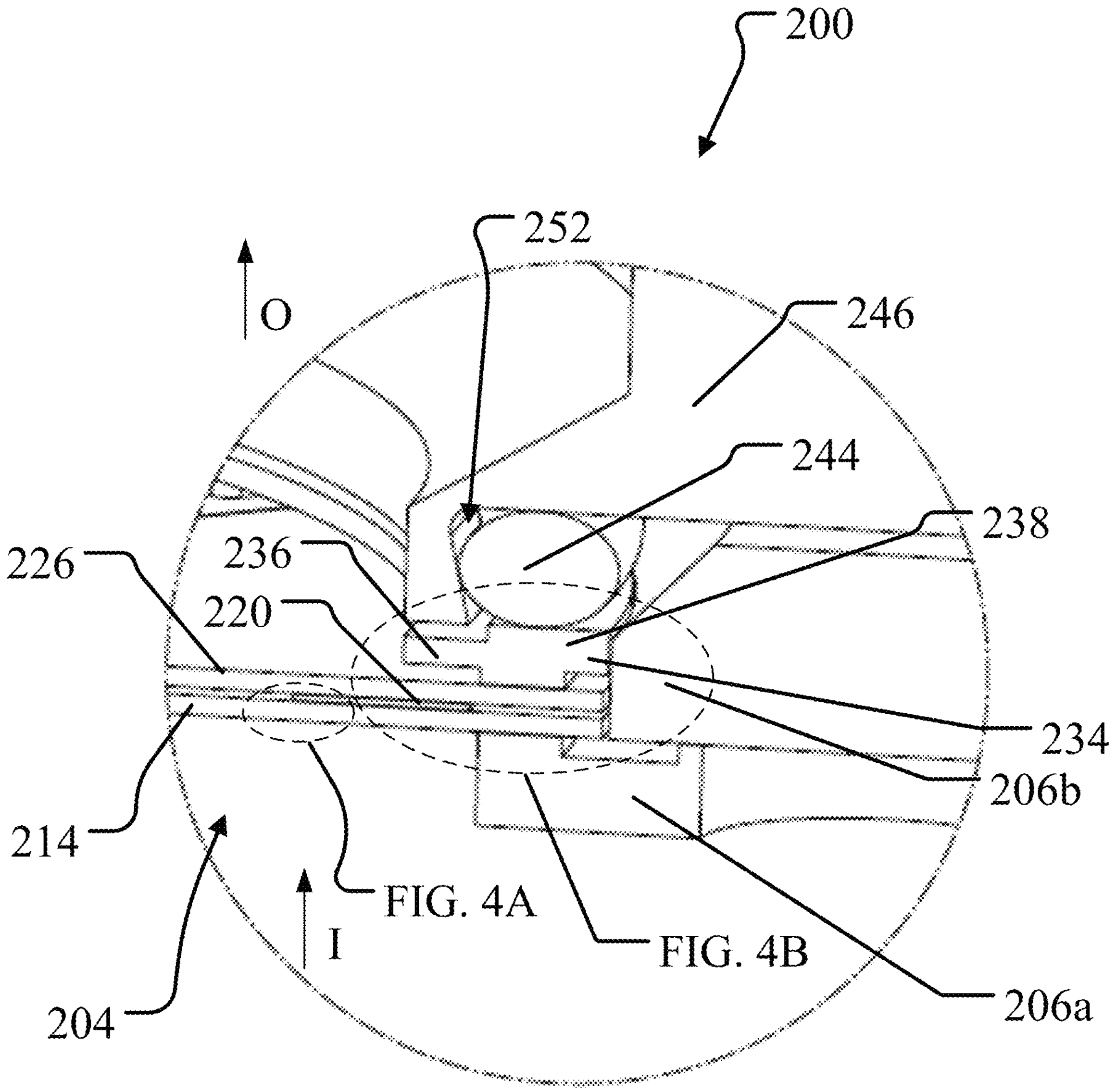
FIG. 3B depicts a non-clamping area section view of the MCP cartridge of FIG. 3.

FIG. 3 depicts a top view of the MCP cartridge 200 of FIG. 2, depicting the locations of the sections depicted in FIGS. 3A and 3B. The components depicted in FIG. 3A are described above in the context of FIG. 2 and are not necessarily described further. In the top view, the output MCP 226 is visible though an opening defined by the output housing portion 246. FIG. 3A depicts a clamping area section view of the MCP cartridge 200 of FIG. 3. The input and output sides of the various components thereof are described above, and input I and output O arrows are also depicted for illustrative purposes, to indicate the direction of ion movement into the opening 204*a* of the input housing portion 206*a*. The spring 244 is at least partially disposed within a recess 252 formed in the output housing portion 246. The recess 252 has a height less than undeformed height of the spring 244. Thus, when the cartridge 200 is assembled, the spring 244 is compressed between the output housing portion 246 and the washer 234 (e.g., the outer ring 238 thereof). This generates and evenly distributes a compression force F downward against the other components of the cartridge 200 as described above.

While the spring force is distributed downward (towards the input I side) evenly proximate the perimeter of the input MCP 214 and the output MCP 226, the cartridge 200 is configured such that compression force F is transmitted through particular locations of the cartridge 200 (generally aligned with the clamping areas 232, 218). Relevant to this distribution of compression force F, FIG. 3A also depicts the clamping block 240 described above with regard to FIG. 2. The clamping block 240 is an enlarged portion of the washer 234 proximate and below the inner ring 236 that allows for more even compression force F transmission from the spring 244. The compression force F passes through a path defined by the clamping area 232 of the output MCP 226, the clamping tab 222 of the spacer 220, the clamping area 218 of the input detector plate 214, and to the plate support feature 210 of the input housing portion 206*a*. As noted above, the clamping areas 232, 218 are characterized by an absence of micro-channels therein. Thus, it is acceptable for the micro-channel plates 232, 218 to be contacted on both sides thereof by other structures (e.g., the clamping block 240 and the clamping tab 222). Since no micro-channels are present in these clamping areas 232, 218, there is no risk of gas buildup therein. Lateral movement of the input detector plate 214, the output MCP 226, and other components is prevented by the position of those components within the input housing portion 206*b*.

FIG. 3B depicts a non-clamping area section view of the MCP cartridge 200 of FIG. 3. Certain of the components depicted in FIG. 3B are described above in the context of FIGS. 2 and 3A and are not necessarily described further. One notable difference between the non-clamping area section view of FIG. 3B is that absence of the clamping block 240, the clamping areas 232, the clamping tab 222, and the clamping area 218, all of which are visible in FIG. 3A. As such, since parts of the spacer 220 are in contact with the input detector plate 214 and the output MCP 226, it is important that the micro-channels obstructed on one side by the spacer 220 are not obstructed on the other side, which may lead to a build-up of gas therein. Thus, as can be seen from FIG. 3B, in the areas of the input detector plate 214 and the output MCP 226 that contact the spacer 220, the washer 234, or the input housing portion 206*a*, contact of those elements is on only a single side thereof, thus ensuring that the micro-channels at those locations are not obstructed on both sides thereof. This condition is depicted in more detail in FIG. 4A.

Figure 4A:
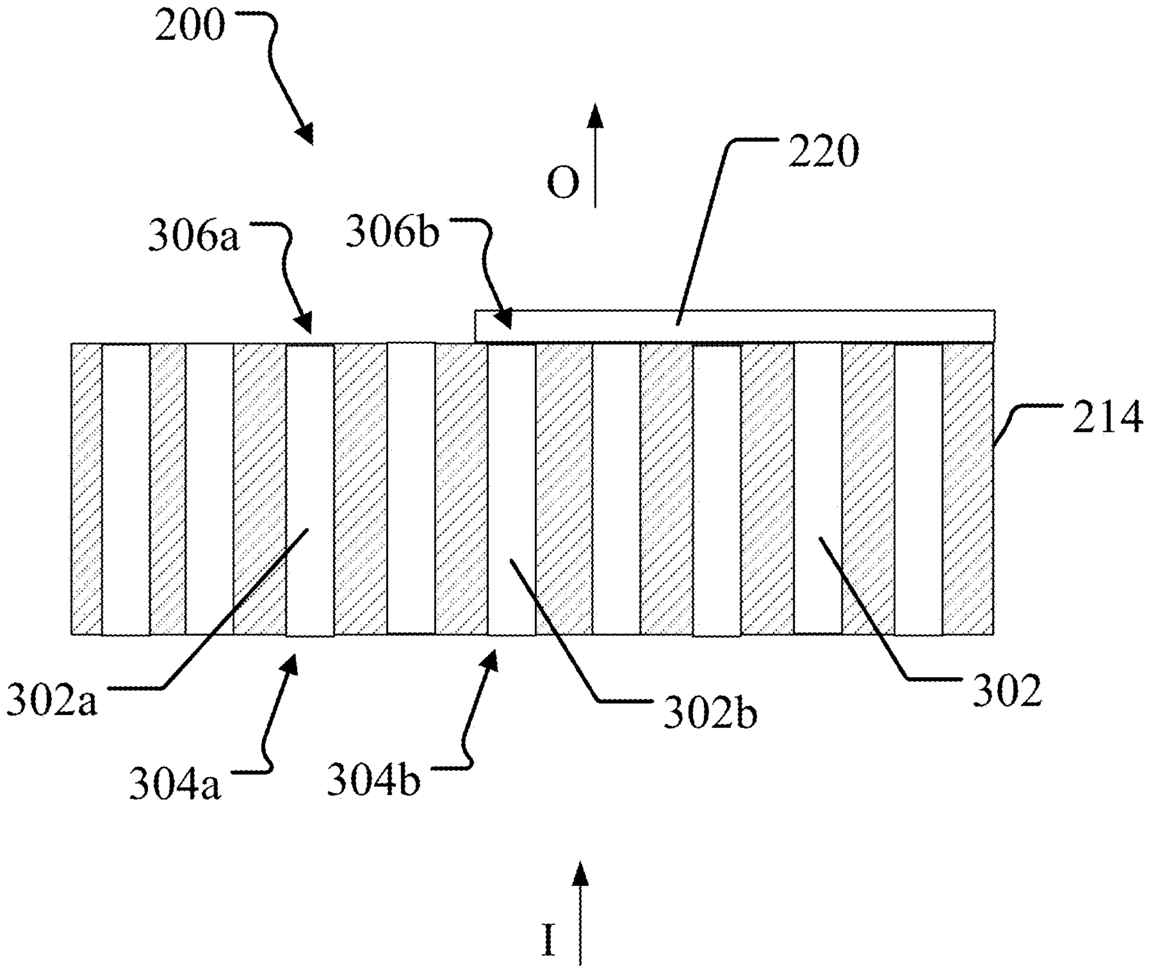
FIG. 4A depicts a partial enlarged cross-section view of a portion of the MCP cartridge of FIG. 3B.

FIG. 4A depicts a partial enlarged cross-sectional view of the MCP cartridge 200 of FIG. 3. For the purposes of explanation, the relevant parts of the cartridge include an input MCP 214 that defines a number of micro-channels 302 therethrough. The micro-channels 302 are depicted as straight for simplicity; more often, micro-channels (or discrete sections thereof) are disposed at an angle to the sides of the MCP 214. FIG. 4A also depicts an obstructing element, which in this case is the spacer 220. In other locations, the obstructing element may be the plate support structure (relevant to the input MCP), or the spacer or the washer (relevant to the output MCP), or some other component. In general, an "obstructing element" may be located on an input side I or an output side O of the particular MCP. Each channel 302 includes an input channel mouth 304 and an output channel mouth 306. At least one mouth 304, 306 of each micro-channel 304 must remain unobstructed to ensure removal of residual gasses and thereby prevent a potentially damaging discharge. If the vacuum pressure in the micro-channels is not sufficiently low prior to application of the high voltage to the MCP 214, then a glow discharge may form in the micro-channels. The power dissipation in the glow discharge causes localized thermal damage to the MCP 214. Thus, for micro-channel 302*a*, both the input channel mouth 304*a* and output channel mouth 306*a* are unobstructed. For micro-channel 302*b*, the input channel mouth 304*b* is unobstructed, while the output channel mouth 306*b* is obstructed.

Figure 4B:
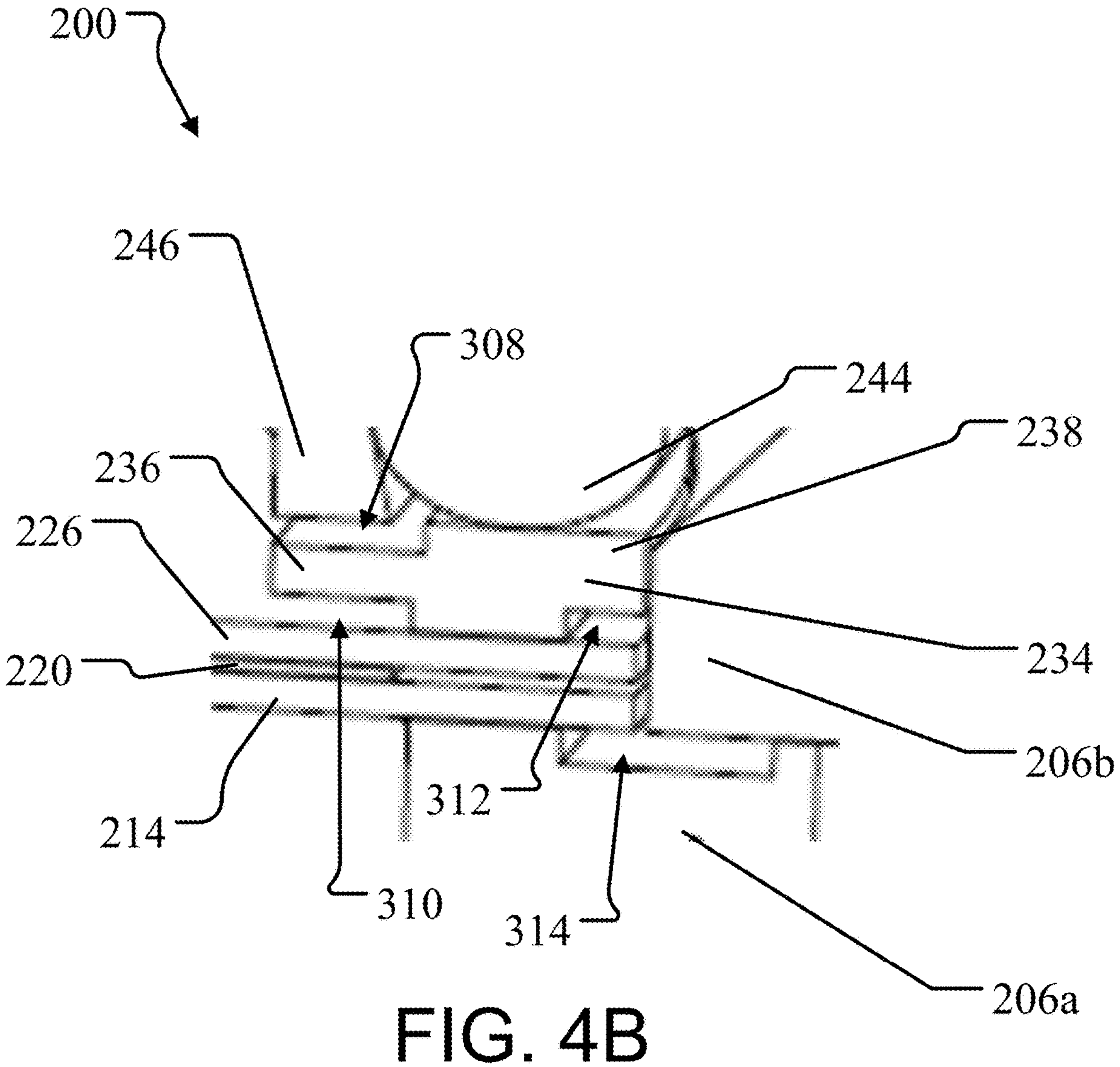
FIG. 4B depicts a partial enlarged cross-section view of another portion of the MCP cartridge of FIG. 3B.

FIG. 4B depicts a partial enlarged cross-section view of another portion of the MCP cartridge 200 of FIG. 3. A number of components depicted in FIG. 4B are described above in the context of FIGS. 3A-3B (and others) and, as such, are not necessarily described further. As noted above, the washer 234 includes an inner ring 236 and an outer ring 238. The inner ring 236 is defined in part by an inner ring output recess 308 and an inner ring input recess 310. The inner ring output recess 308 provides clearance to accommodate the output housing portion 246 as it compresses downward on the biasing element 244. The inner ring input recess 310 effectively raises a bottom portion of the washer 234 that would otherwise be positioned above the spacer 220. If that inner ring input recess 310 was not present, micro-channels therebelow would be obstructed both above (by the washer 234) and below (by the spacer 220). Note, this inner ring input recess 310 is not present in FIG. 3A, where the clamping block 240 is in contact with the clamping area 232. The washer 345 also includes an outer ring input recess 312 located above a periphery of the output MCP 226. The absence of washer material in this location prevents shorting out of the voltage due to contact between the washer 234 and the exposed edge of the output MCP 226. A similar input housing portion recess 314 is defined by the input housing portion 206*a* to prevent contact with the input MCP 214 and shorting thereof.

Figure 5:
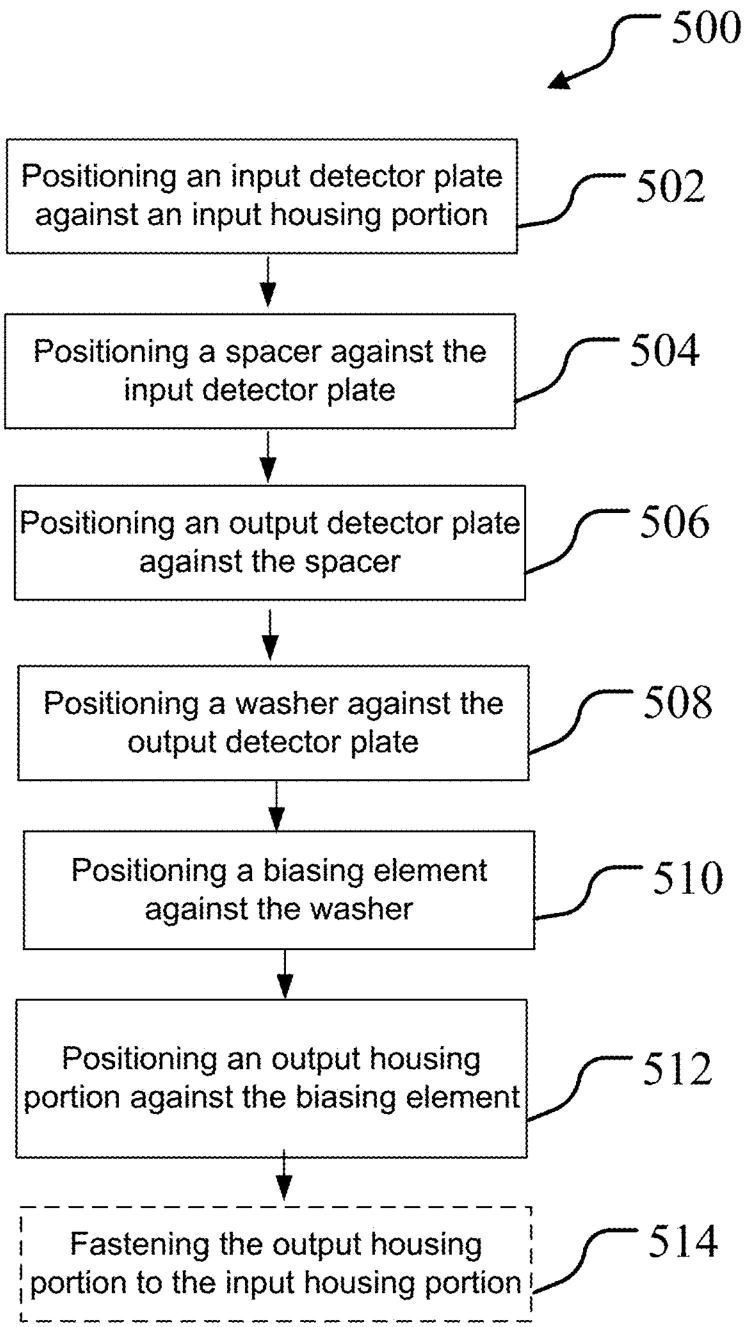
FIG. 5 depicts a method of assembling a cartridge for a detector assembly.

FIG. 5 depicts a method 500 of assembling a cartridge for a detector assembly. The method 500 begins with operation 502, positioning an input detector plate against an input housing portion. The input detector plate includes a plurality of input plate clamping areas, which may be evenly distributed about a perimeter thereof. Further, the input housing portion includes a plurality of plate support features, desirably, the same number as the number of input plate clamping areas. Flow continues to operation 504, positioning a spacer against the input detector plate. The spacer includes a plurality of clamping tabs, again a number similar to that of the clamping areas. In operation 506, positioning an output detector plate against the spacer, is performed. The output detector plate also includes a plurality of output plate clamping areas, which again are of a number corresponding to the input plate clamping areas. In operation 508, positioning a washer against the output detector plate, is performed. The washer includes a plurality of clamping blocks equal to the number of clamping areas. Operation 510 includes positioning a biasing element against the washer, examples of which are described elsewhere herein. Operation 512 includes positioning an output housing portion against the biasing element. Due to the resilience of the biasing element, this action also applies a biasing force from the biasing element to each of the washer, the output detector plate, the spacer, the input detector plate, and the input housing portion, which are all aligned. The biasing force is applied proximate a perimeter of each of the identified elements, given the relative location of the various contacting components. To complete assembly of the cartridge, operation 514, fastening the output housing portion to the input housing portion, is performed. This action secures the housing together, and may also further apply and adjust the biasing force as the radial spring is further compressed.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A cartridge assembly for a mass spectrometer, the cartridge assembly comprising:

- two detector plates, each of the two detector plates comprising (a) an active area defining a plurality of channels from a first side of each of the two detector plates to a second side of each of the two detector plates, and (b) a plurality of clamping areas;
- a spacer disposed between the two detector plates, the spacer comprising a plurality of clamping tabs, wherein each of the plurality of clamping tabs are aligned with each of the plurality of clamping areas;
- a washer disposed proximate a second detector plate of the two detector plates, wherein the washer comprises a plurality of clamping blocks, wherein each of the plurality of clamping blocks are aligned with each of the plurality of clamping tabs;
- a cartridge housing comprising:
  - a first housing portion disposed adjacent a first detector plate of the two detector plates; and
  - a second housing portion disposed adjacent the second detector plate;
- a plurality of fasteners spanning the first housing portion and the second housing portion; and
- a biasing element disposed between the washer and the first housing portion.

2. The cartridge assembly of claim 1, wherein the plurality of clamping areas are disposed proximate a perimeter of the each of the two detector plates.

3. The cartridge assembly of claim 1, wherein the plurality of clamping areas comprise channelless portions of each of the two detector plates.

4. The cartridge assembly of claim 1, wherein each of the plurality of clamping tabs extend outward from a perimeter of the spacer.

5. The cartridge assembly of claim 1, wherein the washer comprises an inner ring and an outer ring, and wherein the clamping blocks extend from the inner ring.

6. The cartridge assembly of claim 5, wherein the inner ring is raised relative to the second detector plate.

7. The cartridge assembly of claim 1, wherein the biasing element comprises an axial canted coil spring disposed proximate an outer portion of the washer.

8. A cartridge assembly for a mass spectrometer, the cartridge assembly comprising:

- an input detector plate, wherein the input detector plate defines a plurality of input plate channels extending from an input side of the input detector plate to an output side of the input detector plate;
- an output detector plate, wherein the output detector plate defines a plurality of output plate channels extending from an input side of the output detector plate to an output side of the output detector plate, and wherein the input detector plate and the output detector plate are aligned along a common axis;
- a spacer in contact with the output side of the input detector plate and the input side of the output detector plate;
- a washer disposed in contact with the output side of the output detector plate;
- an input housing portion disposed in contact with the input side of the input detector plate; and
- a biasing element in contact with the washer for biasing each of the washer, the output detector plate, the spacer, and the input detector plate towards the input housing portion.

9. The cartridge assembly of claim 8, wherein each of the plurality of input plate channels and each of the plurality of output plate channels comprises:

- a channel axis disposed at an angle to the common axis;
- an input channel mouth defined by the input side of each of the input plate and the output plate, respectively; and
- an output channel mouth defined by the output side of each of the input plate and the output plate, respectively.

10. The cartridge assembly of claim 9, wherein the plurality of input plate channels comprise a housing subset of input plate channels, wherein the input channel mouth of the housing subset of input plate channels is obstructed by the input housing portion, and wherein the output channel mouth of the housing subset of input plate channels is unobstructed.

11. The cartridge assembly of claim 9, wherein the plurality of input plate channels comprises a spacer subset of input plate channels, wherein the input channel mouth of the spacer subset of input plate channels is unobstructed, and wherein the output channel mouth of the spacer subset of input plate channels is obstructed by the spacer.

12. The cartridge assembly of claim 9, wherein the plurality of output plate channels comprises a spacer subset of output plate channels, wherein the input channel mouth of the spacer subset of output plate channels is obstructed by the spacer, and wherein the output channel mouth of the spacer subset of output plate channels is unobstructed.

13. The cartridge assembly of claim 9, wherein the plurality of output plate channels comprises a washer subset of output plate channels, wherein the input channel mouth of the washer subset of output plate channels is unobstructed, and wherein the output channel mouth of the washer subset of output plate channels is obstructed by the washer.

14. The cartridge assembly of claim 8, wherein the output detector plate comprises a clamping area characterized by an absence of the plurality of output plate channels.

15. The cartridge assembly of claim 14, wherein the washer contacts the clamping area on an output side of the output detector plate and the spacer contacts the clamping area on an input side of the output detector plate.

16. The cartridge assembly of claim 8, wherein the biasing element comprises an axial canted coil spring having an inner diameter greater than an inner diameter of the washer.

17. The cartridge assembly of claim 16, further comprising an output housing portion, wherein the axial canted coil spring biases the washer away from the output housing portion.

18. A method of assembling a cartridge, the method comprising:

positioning an input detector plate against an input housing portion, wherein the input detector plate comprises a plurality of input plate clamping areas, and wherein the input housing portion comprises a plurality of plate support features;

positioning a spacer against the input detector plate, wherein the spacer comprises a plurality of clamping tabs;

positioning an output detector plate against the spacer, wherein the output detector plate comprises a plurality of output plate clamping areas;

positioning a washer against the output detector plate, wherein the washer comprises a plurality of clamping blocks;

positioning a biasing element against the washer; and positioning an output housing portion against the biasing element, wherein the plurality of plate support features, the plurality of input plate clamping areas, the plurality of clamping tabs, the plurality of output plate clamping areas, and the plurality of clamping blocks are aligned.

19. The method of claim 18, further comprising fastening the output housing portion to the input housing portion, wherein fastening the output housing portion to the input housing portion applies a biasing force from the biasing element to each of the washer, the output detector plate, the spacer, the input detector plate, and the input housing portion.

20. The method of claim 18, further comprising applying a biasing force with the biasing element proximate a perimeter of each of the input housing portion, the input detector plate, the spacer, the output detector plate, and the washer.

* * * * *